United States Patent [19]

Trommer

[11] Patent Number: 4,772,787
[45] Date of Patent: Sep. 20, 1988

[54] MONOLITHICALLY INTEGRATED OPTO-ELECTRONIC SEMICONDUCTOR COMPONENT

[75] Inventor: Reiner Trommer, Munich, Fed. Rep. of Germany

[73] Assignee: Siemens Aktiengesellschaft, Berlin and Munich, Fed. Rep. of Germany

[21] Appl. No.: 809,724

[22] Filed: Dec. 17, 1985

[30] Foreign Application Priority Data

Jan. 7, 1985 [DE] Fed. Rep. of Germany ....... 3500317

[51] Int. Cl.[4] .................................................. G02B 6/42
[52] U.S. Cl. ............................ 250/227; 350/96.15; 350/96.11; 357/30
[58] Field of Search .............. 250/227; 357/30, 19, 357/55, 58; 350/96.15, 96.17, 96.19, 96.20, 96.21, 96.11

[56] References Cited

U.S. PATENT DOCUMENTS

| | | | |
|---|---|---|---|
| 3,896,305 | 7/1975 | Ostrowsky et al. | 250/227 |
| 4,130,343 | 12/1978 | Miller et al. | 350/96.17 |
| 4,152,713 | 5/1979 | Copeland, III et al. | 357/19 |
| 4,301,462 | 11/1981 | Lowry | 357/30 |
| 4,611,886 | 9/1986 | Cline et al. | 250/227 |

FOREIGN PATENT DOCUMENTS 0049304 3/1985 Japan ............................... 350/96.15

Primary Examiner—Edward P. Westin
Attorney, Agent, or Firm—Hill, Van Santen, Steadman & Simpson

[57] ABSTRACT

A monolithically integrated opto-electronic semiconductor component characterized by a semiconductor substrate having a first surface and a second surface extending parallel to each other, a strip waveguide being applied to the first surface to conduct radiation, such as light, in a path parallel to the first surface, a coupling element for coupling radiation from the strip waveguide through the substrate to a region on the second surface, a photodetector being applied to the second surface at the region for receiving the light which has been coupled laterally from the strip waveguide through the substrate. Preferably, the coupling means comprises a V-shaped groove having slanting surfavces forming a mirror which reflects the light substantially at right angles to the path in the strip waveguide.

9 Claims, 1 Drawing Sheet

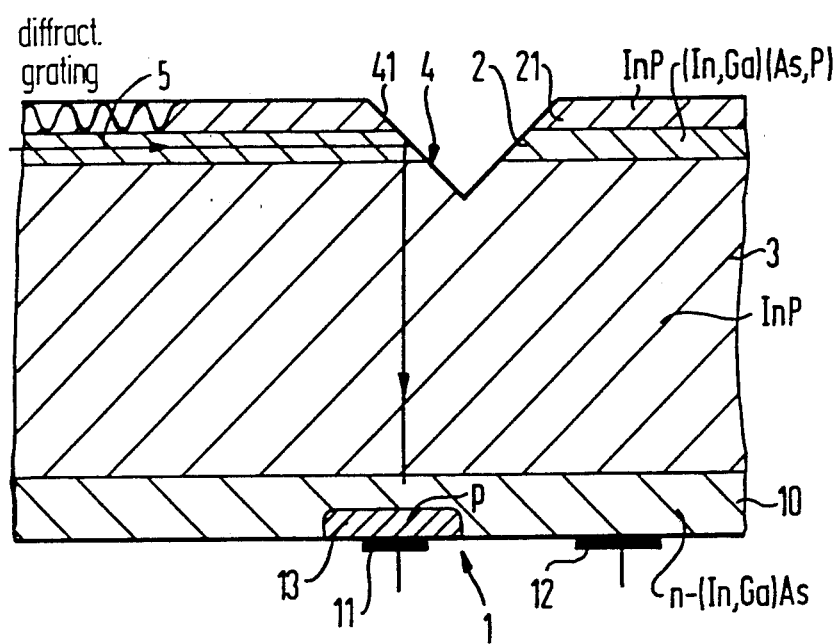

MONOLITHICALLY INTEGRATED OPTO-ELECTRONIC SEMICONDUCTOR COMPONENT

BACKGROUND OF THE INVENTION

The present invention is directed to a monolithically integrated opto-electronic semiconductor component having at least one photodetector optically connected to at least one light waveguide.

Semiconductor components of the type having one or more photodetectors are illuminated by one or more light waveguides and will be employed in the future as interfaces between optical and electrical signal transmission elements.

SUMMARY OF THE INVENTION

The object of the present invention is to provide a three-dimensional execution of a component of a type having at least one photodetector optically coupled to at least one light waveguide, which device enables an advantageous optical coupling between the light waveguides and photodetectors, for example, advantageous illumination of the photodetectors by the light waveguides.

To accomplish this object, the present invention is directed to a monolithically integrated opto-electronic semiconductor component having at least one photodetector optically coupled to at least one light waveguide, said component consisting of a semiconductor substrate, a light waveguide being formed on one side of said semiconductor substrate, a photodetector being formed on the opposite side of said substrate and a coupling element being provided, said coupling element coupling radiation out of said light waveguide and directing it through said substrate to said photodetector.

The advantage of the arrangement of the present invention lies wherein that the technological steps for the manufacture of the waveguide and photodetectors can be implemented largely independently of one another and that the photodetector is illuminated perpendicularly to its surface in a conventional fashion. This, in turn, leads to low coupling losses, a high quantum efficiency and a high response speed. A preferred embodiment of the component of the invention is fashioned such that the coupling element is composed of a path-folding mirror face which deflects or reflects the radiation out of the waveguide onto the photodetector. In accordance with a further improvement, the path-folding mirror face can preferably be realized by a slanting side wall of a furrow or groove which can be produced by etching a V-shaped groove in the surface of the substrate.

The photodetector may be composed of a photodiode, a phototransistor or a photoconductor.

The light waveguide is preferably fashioned as a layer or strip waveguide on the substrate and the light waveguide can contain at least one additional optical element which can be either a diffraction grating or an electro-optical modulator. Other elements, however, come into consideration in addition to these specific optical elements which are preferably employed.

BRIEF DESCRIPTION OF THE DRAWINGS

The figure shows a cross-sectional view taken in a direction of propagation of a light ray being conducted in a waveguide of the semiconductor component in accordance with the present invention.

DESCRIPTION OF THE PREFERRED EMBODIMENTS

The principles of the present invention are particularly useful when incorporated in a semiconductor component having a substrate 3 composed of a substrate crystal of InP. A light waveguide is composed of a light-conducting layer 2 which is formed on one surface of the substrate 3 such as by applying a layer of (In,Ga)-(As,P) on a surface such as the upper surface of the substrate. This layer is then covered by an outer layer 21 of InP. A double-heterostructure of InP/(In,Ga)-(As,P) will form a light waveguide overall and thus establish a strip waveguide on the upper surface of the substrate 3.

In the illustration, it is assumed that the radiation propagates parallel to the plane of the drawing in the light-conducting layer 2 forming the actual light waveguide. This direction is indicated by the arrow 5 in the figure.

A PIN diode 1 is formed on the other side of the substrate 3 which is the lower side as illustrated. This PIN diode is obtained by a light-absorbing layer 10 of n-(In,Ga)As being applied to the lower side and by a p-doped region 13 formed in this layer 10 having a p-contact 11 applied to the region 13 and an n-contact 12 is applied to the layer 10 outside of the region 13. The layer 10 is light-absorbing and the InP substrate is transparent to radiation being conducted in the waveguide 2.

Radiation conducted in the waveguide 2 in the direction of arrow 5 is deflected or reflected by a deflection element 4 onto the p-region 13 and thus onto the photodiode 1. The deflection element 4 is illustrated as being formed by a V-groove which extends in a direction perpendicular to the plane of the drawing with an upstream side wall 41. The wall 41 is inclined at an angle of approximately 45° to the direction 5 and faces this direction 5 to form a reflecting surface for the radiation propagating in the direction 5. This reflecting surface can be a total reflecting, refractive surface. It can, however, also be realized, for example, by applying a reflecting layer on the side wall 41.

Deflecting element 4, however, can also be obtained in some other fashion. For example, it can be attained by a path-folding grating introduced onto the surface of the waveguide 2.

Although various minor modifications may be suggested by those versed in the art, it should be understood that I wish to embody within the scope of the patent granted hereon, all such modifications as reasonably and properly come within the scope of my contribution to the art.

I claim:

1. A monolithically integrated opto-electronic semiconductor component having at least one photodetector optically coupled to at least one light waveguide, said component comprising a semiconductor substrate having a light waveguide in the form of a strip waveguide extending along one surface and a photodetector applied on an opposite surface of the substrate, and a coupling element being provided on said substrate, said coupling element coupling radiation laterally out of said strip waveguide and directing said radiation through the substrate onto said photodetector at said opposite surface.

2. A monolithically integrated opto-electronic semiconductor component according to claim 1, wherein the coupling element is composed of a path-folding mirror surface arranged at an angle to the strip waveguide to direct radiation at an angle to the path of the radiation in the strip waveguide onto the photodetector.

3. A monolithically integrated opto-electronic semiconductor component according to claim 2, wherein the path-folding mirror is a slanting side wall of a V-shaped groove extending across said waveguide.

4. A monolithically integrated opto-electronic semiconductor component according to claim 1, wherein the photodetector is selected from a group consisting of photodiodes, phototransistors and photoconductors.

5. A monolithically integrated opto-electronic semiconductor component according to claim 1, wherein the coupling element comprises a V-shaped groove extending through the strip waveguide, said V-shaped groove having a slanting side wall for directing light from the waveguide through the semiconductor substrate onto the photodetector.

6. A monolithically integrated opto-electronic semiconductor component according to claim 1, wherein said light waveguide contains at least one additional optical element.

7. A monolithically integrated opto-electronic semiconductor component according to claim 6, wherein said additional optical element is composed of a diffraction grating.

8. A monolithically integrated opto-electronic semiconductor component having at least one photodetector optically coupled to at least one light waveguide, said component comprising a semiconductor substrate having a first surface and a second surface extending parallel to each other, a strip waveguide being applied to the first surface to conduct light in a path parallel to said first surface, a photodiode applied on the second surface, and a coupling element for coupling radiation from the strip waveguide to the photodiode, said coupling element being a V-shaped groove extending across said strip waveguide and into said first surface, said V-shaped groove reflecting radiation at an angle to said path and through the substrate onto the photodetector on the second surface.

9. A monolithically integrated opto-electronic semiconductor component according to claim 8, wherein said V-shaped groove has slanting walls forming a path folding mirror surface.

* * * * *